(12) United States Patent
Han

(10) Patent No.: US 11,255,412 B2
(45) Date of Patent: Feb. 22, 2022

(54) MULTI-SPEED TRANSMISSION

(71) Applicant: Eun Su Han, Hwaseong-si (KR)

(72) Inventor: Eun Su Han, Hwaseong-si (KR)

( * ) Notice: Subject to any disclaimer, the term of this patent is extended or adjusted under 35 U.S.C. 154(b) by 0 days.

(21) Appl. No.: 17/253,629

(22) PCT Filed: Jul. 9, 2019

(86) PCT No.: PCT/KR2019/008412
§ 371 (c)(1),
(2) Date: Dec. 18, 2020

(87) PCT Pub. No.: WO2020/013565
PCT Pub. Date: Jan. 16, 2020

(65) Prior Publication Data
US 2021/0172502 A1    Jun. 10, 2021

(30) Foreign Application Priority Data
Jul. 10, 2018   (KR) .................. 10-2018-0079805

(51) Int. Cl.
*F16H 3/083*  (2006.01)
*F16D 41/12*  (2006.01)
(Continued)

(52) U.S. Cl.
CPC ............ *F16H 3/083* (2013.01); *F16D 41/12* (2013.01); *F16H 3/089* (2013.01); *B62M 11/06* (2013.01); *B62M 25/02* (2013.01)

(58) Field of Classification Search
CPC ........ F16H 3/083; F16H 3/089; F16H 31/005; F16H 55/02; F16D 41/12; B62M 11/06; B62M 25/02; B62M 25/04; B62M 9/06
See application file for complete search history.

(56) References Cited

U.S. PATENT DOCUMENTS

| 9,657,835 B2 * | 5/2017 | Han ...................... F16H 3/30 |
| 2015/0323068 A1 * | 11/2015 | Han ...................... F16H 3/083 |
| | | 74/374 |
| 2019/0144073 A1 | 5/2019 | Kim et al. |

FOREIGN PATENT DOCUMENTS

| KR | 10-0361581 B1 | 11/2002 |
| KR | 10-1223566 B1 | 1/2013 |

(Continued)

OTHER PUBLICATIONS

International Search Report for PCT/KR2019/008412 dated Oct. 14, 2019 from Korean Intellectual Property Office.

*Primary Examiner* — Victor L MacArthur
(74) *Attorney, Agent, or Firm* — Revolution IP, PLLC

(57) ABSTRACT

The present invention provides a multi-speed transmission including: a driving shaft rotated by an input rotational force; a plurality of driving gears coupled to the driving shaft to be rotated by the rotation of the driving shaft; a plurality of transmission gears engaged with the driving gears; a transmission shaft including a plurality of pawls moved in and out of the outer circumferential surface, and coupled to the transmission gears, specifically, selectively coupled to at least a few of the transmission gears according to the in and out-movement of the pawls; a transmission control means for selectively controlling the in and out-movement of the pawls; a plurality of driven gears engaged with at least a few of the transmission gears; and a driven shaft coupled to the plurality of driven gears and transferring the rotational force to an object to be driven.

7 Claims, 7 Drawing Sheets

(51) Int. Cl.
  *F16H 3/089* (2006.01)
  *B62M 11/06* (2006.01)
  *B62M 25/02* (2006.01)

(56) References Cited

FOREIGN PATENT DOCUMENTS

| KR | 10-1230860 B1 | 2/2013 | |
|---|---|---|---|
| KR | 10-1653144 B1 | 9/2016 | |
| KR | 10-1782895 B1 | 9/2017 | |
| KR | 10-2018-0065679 A | 6/2018 | |
| WO | WO-2010072397 A1 * | 7/2010 | .......... B62M 11/145 |

\* cited by examiner

[FIG. 1]
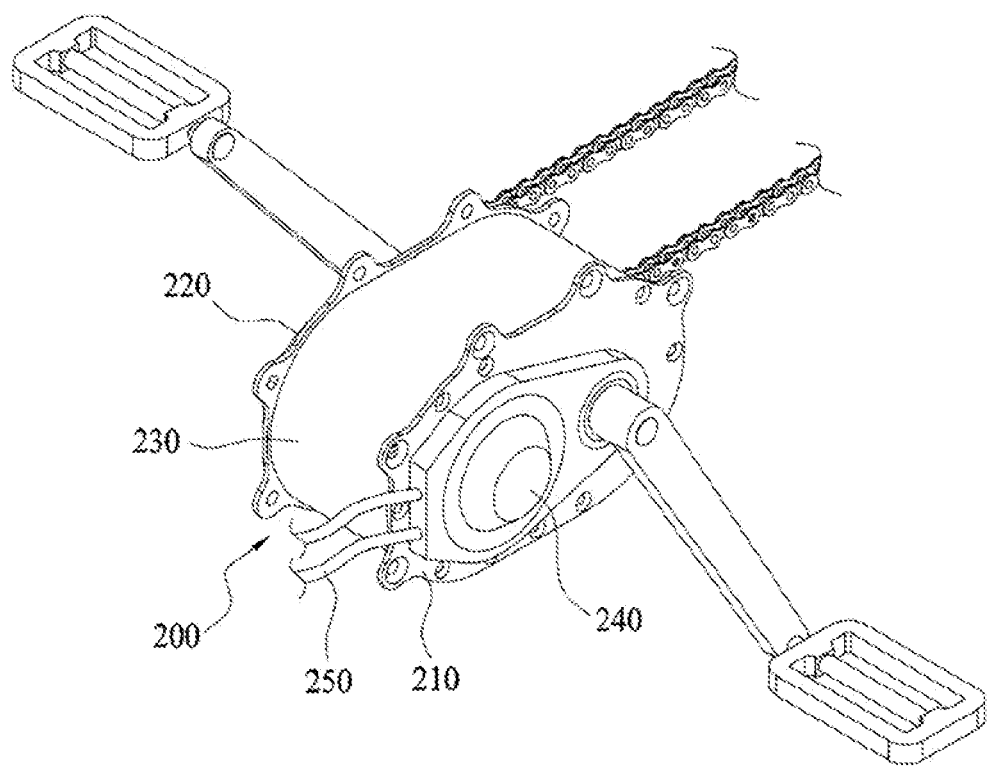

[FIG. 2]
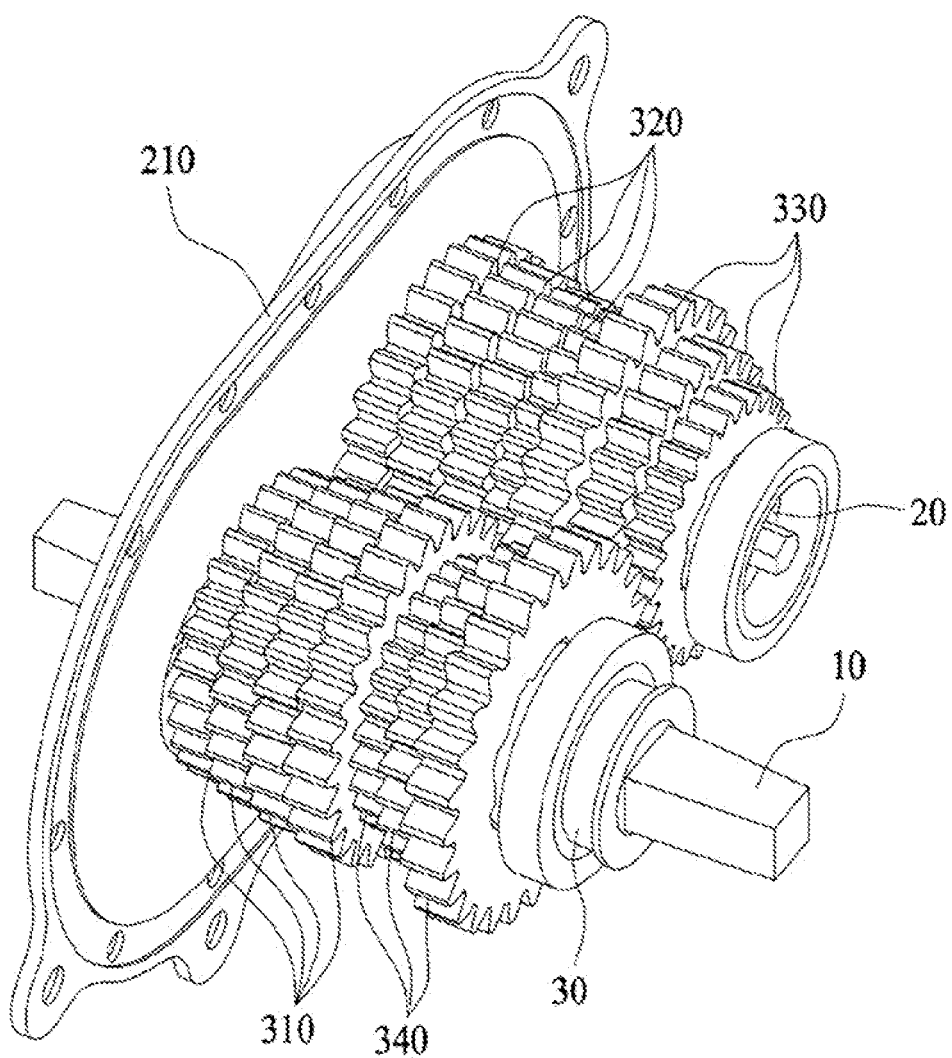

[FIG. 3]
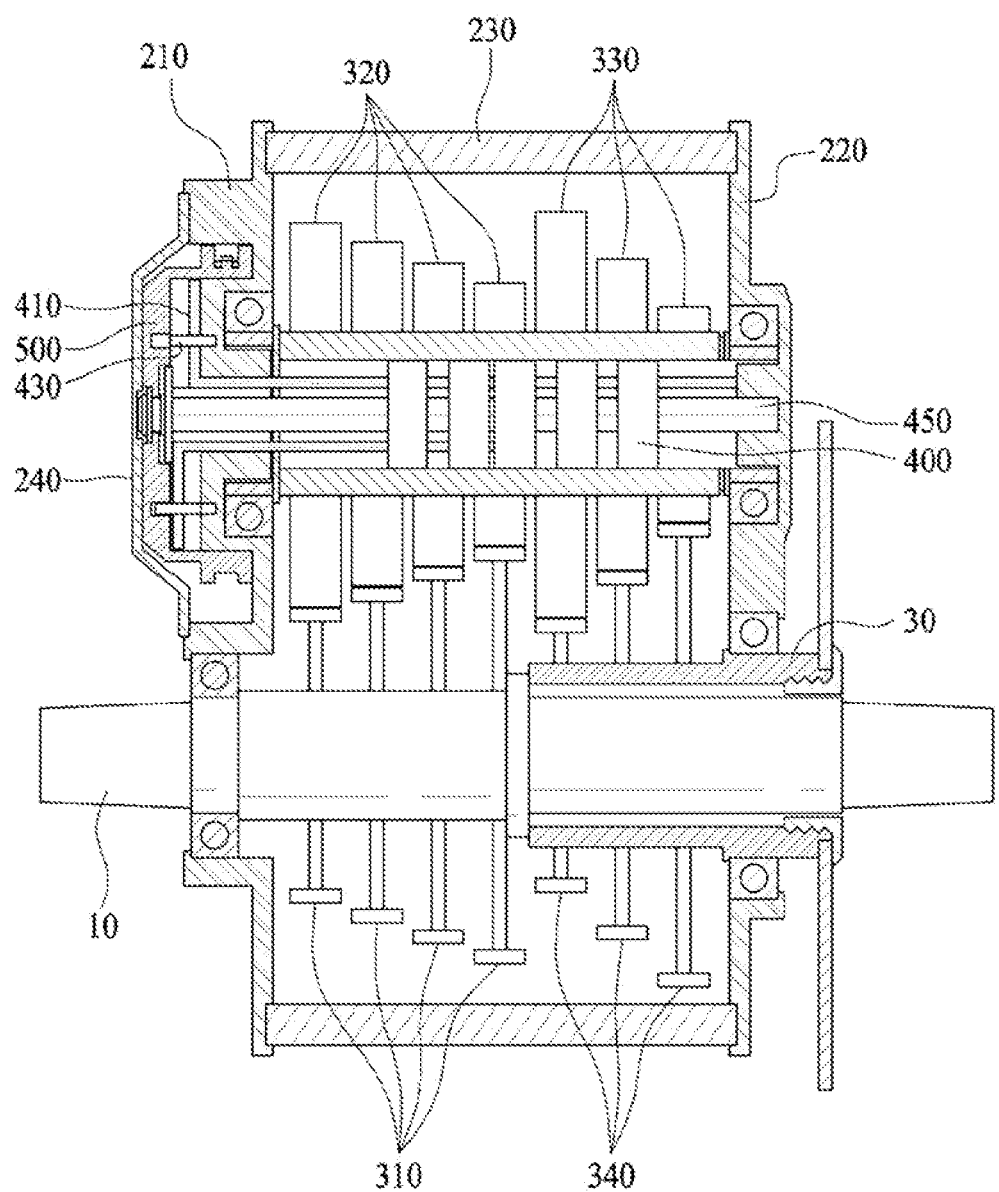

[FIG. 4]
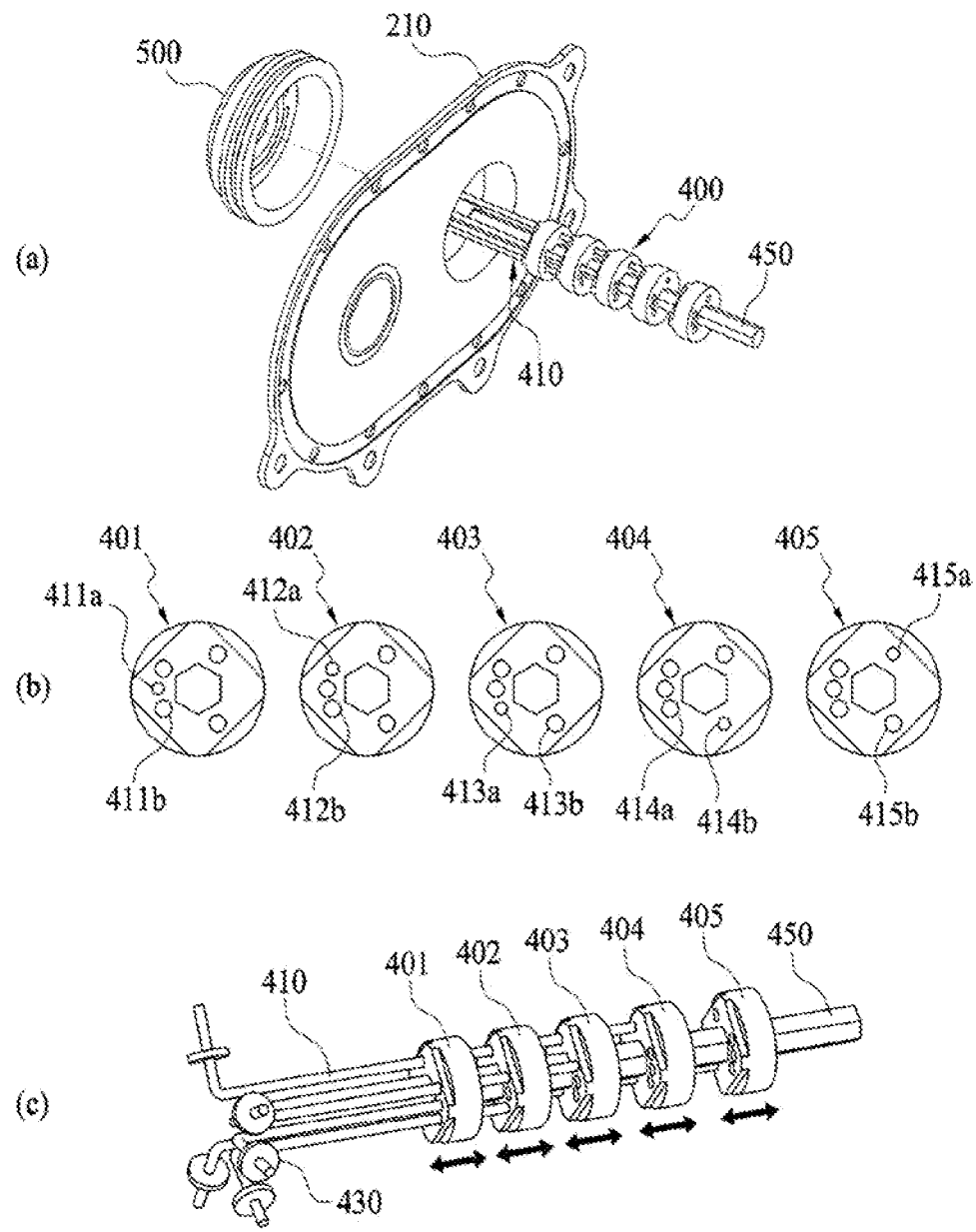

[FIG. 5]
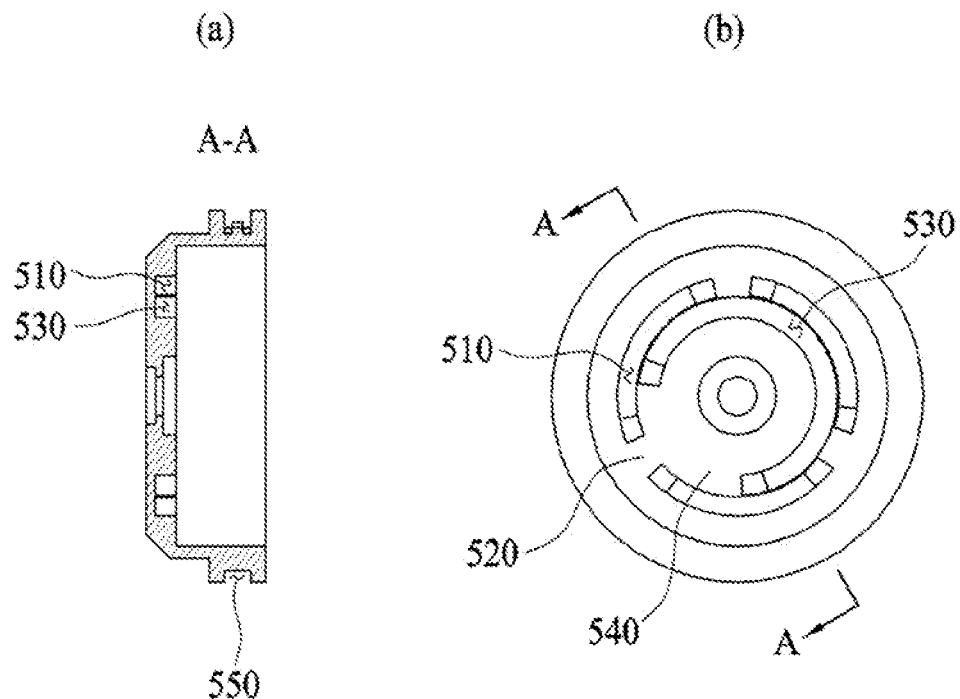

[FIG. 6]
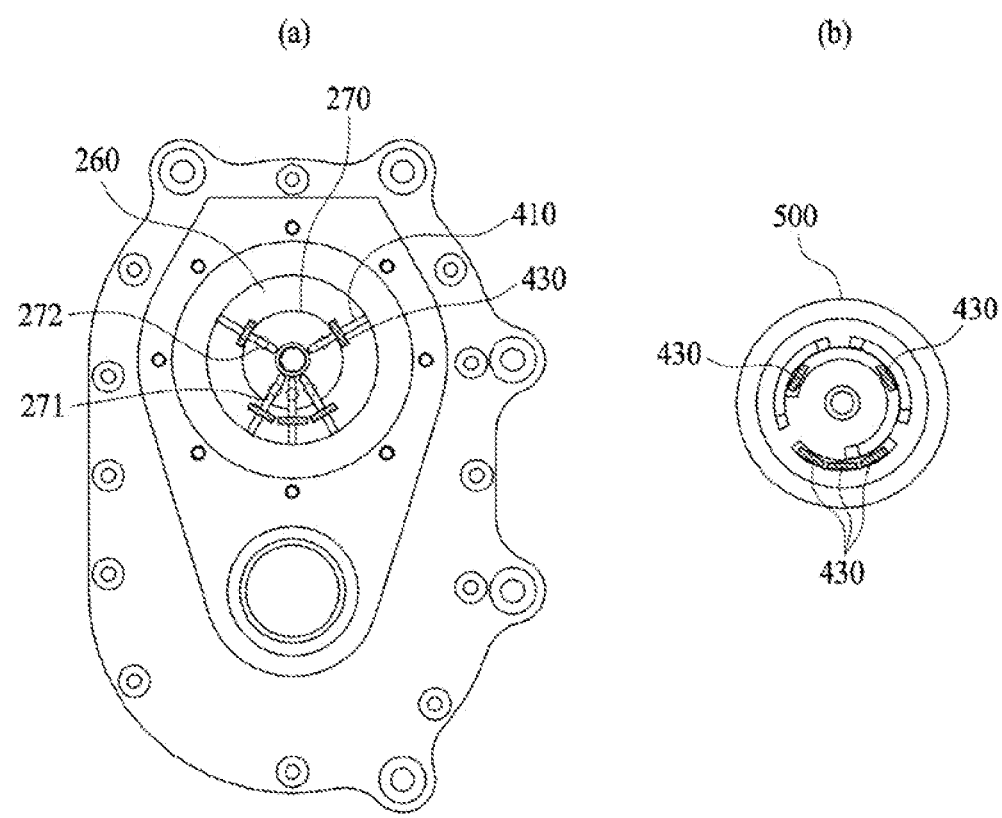

[FIG. 7]
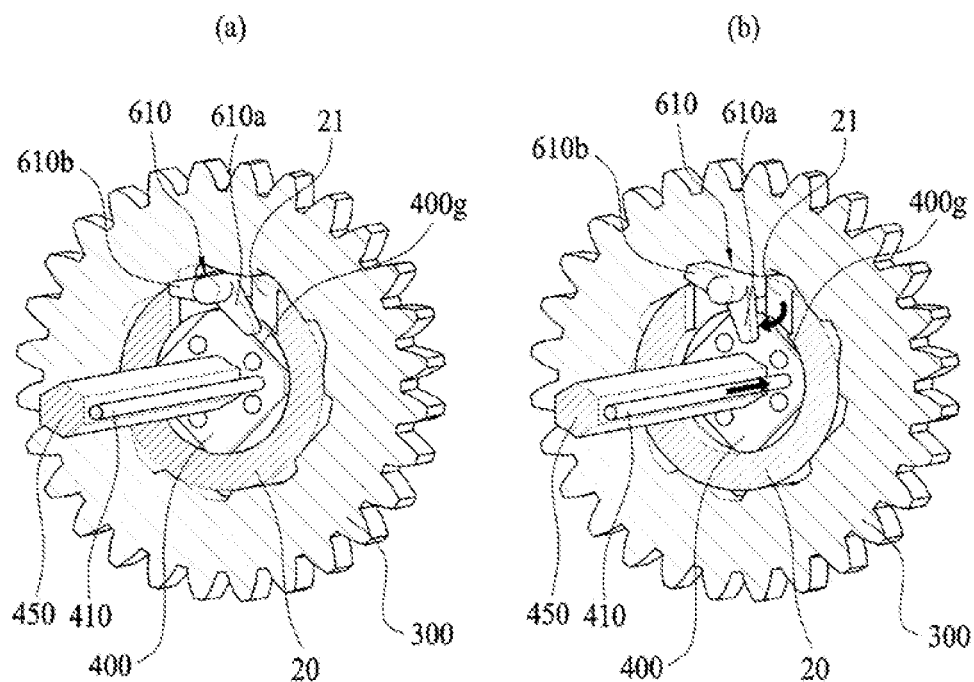
[FIG. 8]
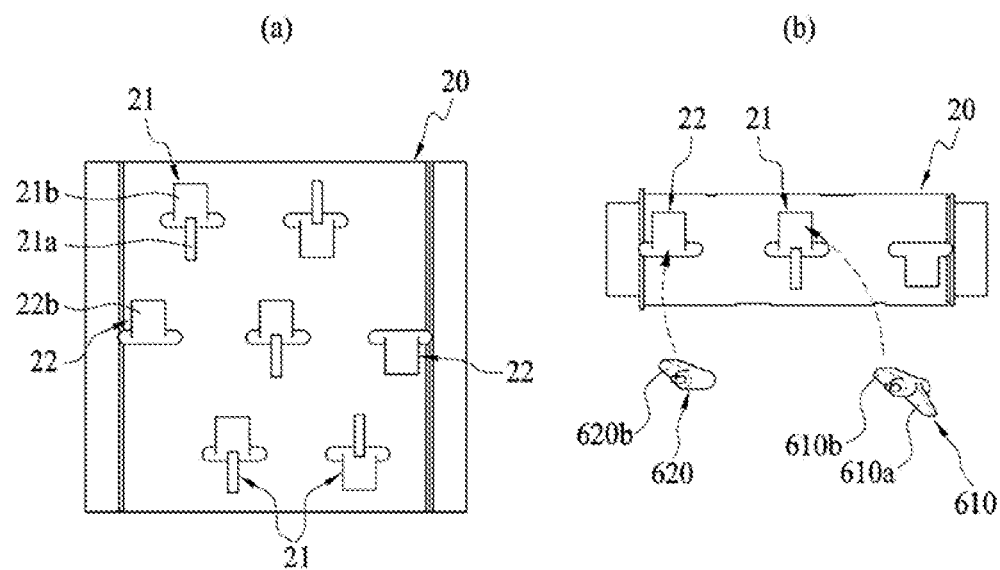

MULTI-SPEED TRANSMISSION

TECHNICAL FIELD

The present invention relates to a multi-speed transmission.

BACKGROUND ART

Contents described in this section merely provide background information on the present invention and do not constitute the related art.

Multi-speed transmissions according to the related art have a problem in that, since both a transmission sprocket and a chain are manufactured while being exposed to the outside, a coupling force between the sprocket and the chain is reduced due to dust and the chain is easily separated from the sprocket. Accordingly, gearbox type transmissions have been manufactured in which the sprocket or a gear is surrounded by a case so as not to be exposed to the outside. However, the gearbox type multi-speed transmissions according to the related art have a disadvantage in that, since internal transmission gears should be coupled by a plurality of shafts, manufacturing costs and time increase, and space efficiency is degraded.

Accordingly, in order to solve these problems, the applicant has proposed a multi-speed transmission which occupies a small space even while reducing manufacturing costs and time, thereby achieving excellent space efficiency.

DISCLOSURE

Technical Problem

A bicycle transmission (Korean Patent No. 1223566) according to the related art has an advantage in that all gears are included in one box, and thus the bicycle transmission may not be contaminated due to dust but has a disadvantage in that since a plurality of gears should be coupled to different shafts, a volume increases and space efficiency decreases.

Thus, the present invention is directed to providing a multi-speed transmission that compensates for the above-described disadvantages of the related art.

Technical Solution

One aspect of the present invention provides a multi-speed transmission including: a driving shaft rotated as a rotational force is input; a plurality of driving gears coupled to the driving shaft and rotated by a rotation of the driving shaft; a plurality of transmission gears engaged with the driving gears; a transmission shaft including a plurality of pawls protruding and retracting from an outer peripheral surface, coupled to the transmission gears, and selectively coupled to at least some of the transmission gears according to the protruding/retracting of the pawls; a gear shifting control part configured to selectively control the protruding/retracting of the pawls; a plurality of driven gears engaged with at least some of the transmission gears; and a driven shaft coupled to the plurality of driven gears and configured to transmit a rotation force to an object to be driven.

An additional technical solution of the present invention will be partially described in the following description and can be partially and easily identified from the description or can be known by implementation of the present invention.

Both the above-described general description and the following detailed description are merely for illustration and description and do not limit the present invention disclosed in the appended claims.

Advantageous Effects

According to a multi-speed transmission according to the present invention, since all transmission gears are coupled to one shaft and a driving shaft and a driven shaft are located coaxially, space efficiency is excellent.

Further, according to the multi-speed transmission according to the present invention, since the number of required shafts is remarkably small, manufacturing costs and time can be greatly reduced.

DESCRIPTION OF DRAWINGS

FIG. 1 is a perspective view of a multi-speed transmission according to an embodiment of the present invention.

FIG. 2 is a perspective view of a gear part of the multi-speed transmission according to the embodiment of the present invention.

FIG. 3 is a plan view of the gear part of the multi-speed transmission according to the embodiment of the present invention.

FIG. 4 shows a perspective view (see FIG. 4A) of a gear shifting control part of the multi-speed transmission according to the embodiment of the present invention and detailed views (see FIGS. 4B and 4C) of each component of the gear shifting control part.

FIG. 5 shows a side view and a plan view of a gear shifting channel of the multi-speed transmission according to the embodiment of the present invention.

FIG. 6 shows views illustrating a guide rod, a retractable member, and the gear shifting channel of the multi-speed transmission according to the embodiment of the present invention.

FIG. 7 shows views illustrating a coupling operation of a transmission gear according to movement of a guide member of the multi-speed transmission according to the embodiment of the present invention.

FIG. 8 shows an exploded view of a transmission shaft of the multi-speed transmission according to the embodiment of the present invention and a view illustrating a coupling relationship of pawls.

MODES OF THE INVENTION

Hereinafter, exemplary embodiments of the present invention will be described in detail with reference to the accompanying drawings.

However, in the description of the exemplary embodiments of the present invention, when it is determined that the detailed description of well-known functions or configurations makes the subject matter of the present invention unclear, the detailed description will be omitted.

FIG. 1 is a perspective view of a multi-speed transmission according to an embodiment of the present invention.

Referring to FIG. 1, a multi-speed transmission 100 according to the embodiment of the present invention may include a driving shaft 10, a case 200, and an input pedal connected to the driving shaft 10. The case 200, which accommodates a gear part included therein which will be described below, may include a first cover 210, a second cover 220, a body cover 230, and a gear shifting channel cover 240.

Further, the case 200 may further include a wire 250 for rotating a gear shifting channel which will be described below.

FIG. 2 is a perspective view of a gear part of the multi-speed transmission according to the embodiment of the present invention.

FIG. 3 is a plan view of the gear part of the multi-speed transmission according to the embodiment of the present invention.

Referring to FIGS. 2 and 3, the multi-speed transmission according to the embodiment of the present invention may include a gear part 300 that is a collection of gears.

The gear part 300 may include driving gears 310, transmission gears 320 and 330, and a driven gear 340. The gear part 300 may further include a driving shaft 10, a transmission shaft 20, a driven shaft 30, and a gear shifting control part that controls shifting of gears.

The driving shaft 10 may be rotated as a rotational force is input, and the plurality of driving gears 310 may be provided to be coupled to the driving shaft 10 and may be rotated as the driving shaft 10 is rotated. That is, the driving gears 310 do not idle on the driving shaft 10. The driving gears 310 may transmit an input rotational force to the transmission gears 320 and 330. As illustrated in the drawing, the plurality of driving gears 310 may have different dimensions.

The transmission gears 320 and 330 may include first transmission gear parts 320 and second transmission gear parts 330.

The first transmission gear parts 320 may be engaged with the driving gears 310 and may have different dimensions, and the second transmission gear parts 330 may be arranged coaxially with the first transmission gear parts 320, engaged with the driven gear 340, and may have different dimensions.

The first transmission gear parts 320 and the second transmission gear parts 330 may be idle on the transmission shaft 20 or selectively engaged with the transmission shaft 20. In order to obtain a targeted gear composition ratio, only a targeted gear of the plurality of transmission gears 320 and 330 may be engaged with the transmission shaft 20. To this end, at least one of the first transmission gear parts 320 engaged with the driving gear 310 and at least one of the second transmission gear parts 330 engaged with the driven gear 340 may be engaged with the transmission shaft 20. Overall, at least two gears of the transmission gears 320 and 330 are engaged with the transmission shaft 20.

However, here, a gear located on the leftmost side of the first transmission gear parts 320 and having the largest diameter and a gear located on the rightmost side of the second transmission gear parts 330 and having the smallest diameter may always be coupled to the transmission shaft 20. The gear located on the leftmost side of the first transmission gear parts 320 and having the largest diameter and the gear located on the rightmost side of the second transmission gear parts 330 and having the smallest diameter correspond to a lowest stage gear composition ratio at which the lowest speed can be achieved. That is, a lowest stage gear ratio is set as a default value such that the multi-speed transmission 100 can be operated at the lowest stage gear ratio even without gear shifting.

The transmission shaft 20 may be selectively coupled to at least some of the transmission gears 320 and 330. The transmission shaft 20 may include a plurality of pawls 600 that protrude and retract from the outer peripheral surface, and may include a plurality of pawl insertion parts to which the pawls 600 are to be coupled. The pawls 600 and the pawl insertion parts will be described in detail with reference to FIG. 8 which will be described below.

The transmission shaft 20 may include a hollow, and the hollow may include a plurality of guide members 400 that are moved in a lengthwise direction of the transmission shaft 20, thus coming into selective contact with the plurality of pawls 600, and guiding the protruding and retracting of the pawls 600. Although details will be described below, in order to perform gear shifting control, the transmission gears 320 and 330 may be selectively coupled to the transmission shaft 20 according to a selective front-rear movement of the guide members 400.

The driven gear 340 may be engaged with at least some of the transmission gears 320 and 330, preferably, the second transmission gear parts 330.

The driven shaft 30 may be coupled to the driven gear 340 so as not to idle. The driven shaft 30 may include a hollow part in which at least a portion of the driving shaft 10 may be accommodated and may be coupled to the outer peripheral surface of the driving shaft 10 so as to idle. The driven shaft 30 may have a separate sprocket mounted on the outer side thereof and thus serve to transmit a rotational force to an object to be driven through a chain.

In this way, the driven shaft 30 may be disposed coaxially with the driving shaft 10 rather than a separate shaft and coupled to the outer peripheral surface of the driving shaft 10 so as to idle, thereby maximizing space utilization efficiency.

FIG. 4 shows a perspective view (see FIG. 4A) of the gear shifting control part of the multi-speed transmission according to the embodiment of the present invention and detailed views (see FIGS. 4B and 4C) of each component of the gear shifting control part.

FIG. 5 shows a side view and a plan view of a gear shifting channel of the multi-speed transmission according to the embodiment of the present invention.

FIG. 6 shows views illustrating a guide rod, a retractable member, and the gear shifting channel of the multi-speed transmission according to the embodiment of the present invention.

FIG. 7 shows views illustrating a coupling operation of a transmission gear according to movement of the guide members of the multi-speed transmission according to the embodiment of the present invention.

Referring to FIGS. 4 to 7, the gear shifting control part can control gear shifting through selective coupling of the transmission shaft 20 and the transmission gears 320 and 330.

The gear shifting control part may include a wire, a gear shifting channel 500, the guide members 400, and the pawls 600. The gear shifting control part may further include guide rods 410 connecting the guide members 400 and the gear shifting channel 500 and retractable members 430.

First, an appropriate mechanism, by which the gear shifting control part is operated, is controlled such that the gear shifting channel 500 is rotated by operation of the wire, the guide rods 410 are moved in a front-rear direction in a direction of the transmission shaft 20 by the rotation of the gear shifting channel 500, the guide members 400 are accordingly moved in the front-rear direction, the guide members 400 come into selective contact with at least some pawls 600 of the plurality of pawls 600 of the transmission shaft 20 according to the front-rear movement of the guide members 400 to change an arrangement angle of the pawls 600, at least some gears of the transmission gears 320 and 330 located coaxially with the pawls 600 are engaged with the transmission shaft 20 according to the change in the arrangement angle of the pawls 600, and thus a targeted gear composition ratio is set Here, the guide members 400 may be arranged and configured such that three guide members 401-403 on the left side of the drawing interact with three right gears of the first transmission gear parts 320 and two guide members 404-405 on the right side of the drawing interact with two left gears of the second transmission gear parts 330.

First, referring to FIG. 5, the gear shifting channel 500 may be rotated by the wire and may include gear shifting guide grooves 510 and 530 formed therein to have a predetermined radius and a predetermined length.

The gear shifting guide grooves 510 and 530 may include first gear shifting guide grooves 510 and a second gear shifting guide groove 530.

The first gear shifting guide grooves 510 may be located on a relatively outer concentric circle and divided into three grooves.

The second gear shifting guide groove 530 may be located on a relatively inner concentric circle and provided as one groove.

As illustrated in the drawing, the first gear shifting guide grooves 510 may be arranged such that angles between the centers of the three grooves with respect to the center of the circle form 120 degrees.

The second gear shifting guide groove 530 is disposed such that one groove is disposed adjacent to the first gear shifting guide grooves 510 in succession.

Although details will be described below, the guide rods 410 or the retractable members 430 are selectively inserted into the gear shifting guide grooves 510 and 530 through the rotation of the above-formed gear shifting channel 500 including the gear shifting guide grooves 510 and 530, and thus the guide members 400 may be moved in the front-rear direction in the direction of the transmission shaft 20.

Next, configurations of the guide members 400, the guide rods 410, the retractable members 430, and a guide shaft 450 can be identified with reference to FIGS. 4A to 4C.

Referring to FIG. 4B, the guide members 400 may be formed as a plurality of guide members 401 to 405. However, although five guide members are illustrated in the drawing, the present invention is not necessarily limited thereto. The number of guide members may be changed as needed and may be at least two.

Each of the guide members 400, that is, 401 to 405, may include one coupling hole 410a, that is, 411a to 415a, and one or more through-holes 410b, that is, 411b to 415b.

The center of each guide member 400 may include a hollow through which the guide shaft 450 passes.

The guide rod 410 may be coupled to the coupling hole 410a. As described above, the guide rod 410 may serve to guide an axial front-rear movement of the guide member 400 according to the rotation of the gear shifting channel 500.

The through-hole 410b may be configured such that the guide rod 410 coupled to another guide member 400 passes through the through-hole 410b.

As the guide members 400 are configured above, as illustrated in FIG. 4C, the plurality of guide members 401 to 405 may be arranged side by side on the same axis and may move in the front-rear direction in the direction of the guide shaft 450 while selectively sliding on the guide shaft 450 according to the rotation of the gear shifting channel 500.

The guide rods 411 to 415 may have different lengths. One sides of the guide rods 411 to 415 may be coupled to the guide members 401 to 405, respectively, and the other sides of the guide rods 411 to 415 may be in contact with the gear shifting channel 500. The other sides of the guide rods 411 to 415 may be bent once to be perpendicular to the lengthwise direction, and the retractable members 430 may be provided in the bent parts.

The retractable members 430 may be formed in a ring shape including a hollow part, and the hollow parts may be coupled to the bent parts of the other sides of the guide rods 411 to 415. The retractable members 430 may be selectively retracted/inserted into the gear shifting guide grooves 510 and 530 according to the rotation of the gear shifting channel 500.

Referring to FIG. 6, a state can be identified in which the guide rods 410 and the retractable members 430 are arranged on one side of the first cover 210 as illustrated.

A gear shifting channel coupling part 260 may be formed on an outer surface of the first cover 210. The gear shifting channel coupling part 260 may be formed in a shape in which the gear shifting channel 500 may be coupled to and seated on the gear shifting channel coupling part 260.

A guide member 270 including a plurality of guide grooves 271 on which at least portions of the guide rods 410 are seated to be movable in the front-rear direction may be included in a central portion of the gear shifting channel coupling part 260. An elastic member 272 that applies a force to the guide rod 410 in an outward direction, that is, in a direction of the gear shifting channel 500, may be included in a lower end of the guide groove 271.

The gear shifting channel coupling part 260 may include a plurality of extended guide grooves extending from the guide grooves 271 of the guide member 270 to an edge of the gear shifting channel coupling part 260, and the extended guide grooves may be formed to accommodate all the guide rods 410 and the retractable members 430 and formed in a predetermined depth so as not to hinder the front-rear movement of the guide rods 410 and the retractable members 430.

Referring back to FIG. 6, a state can be identified in which the respective retractable members 430 are seated on the gear shifting guide grooves 510 and 530 of the gear shifting channel 500. In the drawing, since the respective retractable members 430 do not rotate and the gear shifting channel 500 rotates, at least some of the guide members 400 are selectively moved in the front-rear direction by an operation of selectively inserting or not inserting at least some of the retractable members 430 into the gear shifting guide grooves 510 and 530.

Referring to FIG. 7, the operation of the pawl 600 can be identified according to the front-rear movement of the guide members 400 and an operation mechanism in which the gear and the pawl 600 are coupled or not coupled can be identified according to the operation of the pawl 600.

As illustrated in FIG. 7B, when the pawl 600 disposed on the outer peripheral surface of the transmission shaft 20 and protruding from the outer peripheral surface is not in contact with the guide member 400, the pawl 600 is disposed to be caught by an inner groove of the transmission gear at an angle between the pawl 600 and the guide member 400, and the corresponding transmission gear is rotated while being coupled to the transmission shaft 20. As illustrated in FIG. 7A, when the pawl 600 is in contact with the guide member 400 and the angle between the pawl 600 and the guide member 400 is changed such that the pawl 600 is not caught by the inner groove of the transmission gear, the corresponding transmission gear may be operated to idle on the transmission shaft 20.

Such an operation may be performed by the interaction between the pawl 600 and the guide member 400 illustrated in FIG. 7.

As illustrated in FIG. 7, the pawl 600 may include a first pawl 610. The first pawl 610 may include a guide member contact part 610a that is formed on one side with respect to a central rotary shaft, comes into selective contact with the guide member 400, and is seated on a seating part of the guide member 400 and a gear coupling part 610b that is formed on the other side and is selectively seated on the inner groove of the transmission gear.

Referring back to FIG. 7, an operation relationship between the guide member 400 and the first pawl 610 can be identified. The guide member 400 may include a seating part 400g.

The seating part 400g may be formed in the form of a groove formed in one side of the circular guide member 400. The groove may include a seating inclination surface such that the first pawl 610 may be seated thereon. The seating inclination surface may be in contact with the lower surface of the guide member contact part 610a of the first pawl 610 and may be formed such that the guide member contact part 610a may be seated on the seating inclination surface.

However, in some cases, the seating part 400g is not formed in the form of a groove and may be the outer periphery of the guide member 400. In this case, the guide member contact part 610a may be seated on the outer periphery of the guide member 400.

When the guide member 400 moves to approach the first pawl 610, the guide member contact part 610a of the first pawl 610 rotates around the central rotary shaft while being seated on the seating part 400g along the seating inclination surface, the gear coupling part 610b is rotated and retracted in a counterclockwise direction on the drawing, the transmission gear and the first pawl 610 are not coupled to each other, and thus the gear disposed in the corresponding position idles on the transmission shaft 20.

When the guide member 400 moves away from the first pawl 610, the guide member contact part 610a and the gear coupling part 610b of the first pawl 610 are rotated and protrude around the rotary shaft in a clockwise direction on the drawing, the gear coupling part 610b is coupled to the inner groove of the transmission gear, and thus the corresponding gear is coupled to the transmission shaft 20 and is rotated together with the transmission shaft 20.

The first pawl 610 may include an elastic member on the rotary shaft provided in the center thereof, and the elastic member may be configured to apply an elastic force in a direction in which the gear coupling part 610b protrudes. Thus, when the guide member 400 does not approach, the transmission gear and the first pawl 610 are coupled to each other, and when the guide member 400 approaches so that the first pawl 610 is seated on the seating part 400g of the guide member 400, the transmission gear and the first pawl 610 are not coupled to each other.

FIG. 8 shows an exploded view of the transmission shaft of the multi-speed transmission according to the embodiment of the present invention and is a view illustrating a coupling relationship of pawls.

Referring to FIG. 8A, a state in which the transmission shaft 20 is unfolded can be identified. The transmission shaft 20 may include pawl coupling parts 21 and 22 formed on the outer peripheral surface thereof.

The pawl coupling parts 21 and 22 may include first pawl coupling parts 21 and second pawl coupling parts 22.

The first pawl 610 described above may be coupled to the first pawl coupling part 21 described above. The first pawl coupling part 21 may include a through-hole 21a and an accommodation part 21b, wherein the through-hole 21a may be formed to protrude and retract as the guide member contact part 601a passes through and is rotated, and the accommodation part 21b may be formed such the gear coupling part 610b is temporarily accommodated therein when the gear coupling part 610b is subjected to a retraction operation among an protruding/retraction operation.

A second pawl 620 illustrated in FIG. 8B is coupled to the second pawl coupling part 22. The second pawl coupling parts 22 may be formed at positions where the gears corresponding to the lowest stage gear composition ratio are located and are illustrated as being formed at both ends of the transmission shaft 20 in the drawing. However, the present invention is not necessarily limited thereto, and the second pawl coupling parts 22 may be located at any positions where one gear of the first transmission gear parts 320 and one gear of the second transmission gear parts 330 corresponding to the lowest stage gear composition ratio are located as described above in FIGS. 2 and 3. The second pawl 620 may be coupled to the second pawl coupling part 22 and may always be engaged with the transmission gear coupled in the corresponding position.

That is, as described above, the lowest stage gear is set as a default value to always be engaged. In this state, when some of other transmission gears selected by the operation of the first pawl 610 are coupled to the transmission shaft 20, the gears are shifted according to the gear composition ratio corresponding to the selected transmission gears. That is, since the lowest stage gear always engaged with the second pawl 620 corresponds to a gear composition ratio at which the lowest speed is achieved, when a high stage gear at which a higher speed is achieved is engaged and rotated, a low speed may be ignored, and thus the gear shifting may not be affected. The second pawl 620 may include a gear coupling part 620b, may be coupled to the second pawl coupling part 22, may always protrude with respect to the rotary shaft by the elastic member included in the rotary shaft, and may be engaged with the lowest stage gear among the transmission gears.

The present embodiments merely illustrate the technical spirit of the present invention, and those skilled in the art to which the present invention belongs can derive various modifications and changes without departing from the essential features of the present invention. The present embodiments are intended not to limit the technical spirit of the present invention but to describe the technical spirit of the present invention, and thus the scope of rights of the present invention is not limited by the present embodiments. The scope of protection of the present invention should be interpreted by the appended claims, and all technical ideas equivalent or equal thereto should be interpreted as being included in the scope of rights of the present invention.

The invention claimed is:

1. A multi-speed transmission comprising:
   a driving shaft rotated as a rotational force is input;
   a plurality of driving gears coupled to the driving shaft and rotated by a rotation of the driving shaft;
   a plurality of transmission gears at least some of which are engaged with the driving gears;
   a transmission shaft including a plurality of pawls protruding and retracting from an outer peripheral surface of the transmission shaft, coupled to the transmission gears, and selectively coupled to at least some of the transmission gears according to the protruding and retracting of the pawls;

a gear shifting control part configured to selectively control the protruding and retracting of the pawls;

a plurality of driven gears engaged with at least some of the transmission gears; and a driven shaft coupled to the plurality of driven gears and configured to transmit a rotation force to an object to be driven, wherein the gear shifting control part comprises:

a plurality of guide members arranged in a hollow part of the transmission shaft, moved in a lengthwise direction of the transmission shaft, and accordingly coming into selective contact with the plurality of pawls, and configured to guide the protruding and retracting of the plurality of pawls;

a plurality of guide rods of which one sides are each connected to one of the plurality of guide members;

a wire for gear shifting; and a gear shifting channel rotated by the wire and comprising a gear shifting guide groove formed to have a predetermined radius and a predetermined length, and wherein the plurality of guide rods have the other sides in contact with the gear shifting channel, are selectively inserted into the gear shifting guide grooves as the gear shifting channel is rotated, and thus selectively move the guide members.

2. The multi-speed transmission of claim 1, wherein the driven shaft comprises a hollow part in which at least a portion of the driving shaft is accommodated and is coupled to an outer peripheral surface of the driving shaft to idle.

3. The multi-speed transmission of claim 1, wherein the plurality of guide members are arranged coaxially side by side, wherein each of the guide members comprises:

one coupling hole to which the guide rod is coupled; and one or more through-holes which are arranged adjacent to the coupling hole and through which the guide rod coupled to another guide member passes, and wherein the coupling holes are arranged to be offset from each other.

4. The multi-speed transmission of claim 1, wherein the guide member comprises a seating part comprising a seating inclination surface such that the pawl is seated thereon.

5. The multi-speed transmission of claim 1, further comprising a retractable member disposed on the other side of the guide rod and selectively inserted into the gear shifting guide groove.

6. The multi-speed transmission of claim 5, wherein the retractable member is formed in a ring shape comprising a hollow part, and the hollow part is coupled to the other side of the guide rod.

7. The multi-speed transmission of claim 1, wherein the transmission gears comprise:

first transmission gear parts engaged with the driving gears; and second transmission gear parts arranged coaxially with the first transmission gear parts and engaged with the driven gears, and wherein the transmission gears of the first transmission gear parts and the second transmission gear parts have different dimensions.

* * * * *